(12) United States Patent
Furey et al.

(10) Patent No.: US 12,236,135 B2
(45) Date of Patent: *Feb. 25, 2025

(54) SWITCH DEVICE FOR INTERFACING MULTIPLE HOSTS TO A SOLID STATE DRIVE

(71) Applicant: Marvell Asia Pte Ltd., Singapore (SG)

(72) Inventors: Scott Furey, Cupertino, CA (US); Salil Suri, Fremont, CA (US); Liping Guo, Palo Alto, CA (US); Chih-Lung Liu, San Jose, CA (US); Yingdong Li, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,403

(22) Filed: Jan. 2, 2023

(65) Prior Publication Data

US 2023/0145212 A1 May 11, 2023

Related U.S. Application Data

(63) Continuation of application No. 16/532,081, filed on Aug. 5, 2019, now Pat. No. 11,544,000.

(Continued)

(51) Int. Cl.
*G06F 3/06* (2006.01)
*G06F 9/455* (2018.01)

(52) U.S. Cl.
CPC .......... *G06F 3/0659* (2013.01); *G06F 3/0614* (2013.01); *G06F 3/0664* (2013.01); *G06F 3/0688* (2013.01); *G06F 9/45533* (2013.01)

(58) Field of Classification Search
CPC .... G06F 3/0659; G06F 3/0614; G06F 3/0664; G06F 3/0688; G06F 9/45533
See application file for complete search history.

(56) References Cited

U.S. PATENT DOCUMENTS 6,804,766 B1 10/2004 Noel et al.
7,657,663 B2 2/2010 Freimuth et al.
(Continued)

FOREIGN PATENT DOCUMENTS

CN 103270736 A 8/2013
WO 2014099025 A1 6/2014
WO 2015080690 A1 6/2015

OTHER PUBLICATIONS

Communication pursuant to Article 94(3) EPC in European Pat. App. No. 19190605.6, dated Jan. 19, 2021.
(Continued)

*Primary Examiner* — Tracy A Warren

(57) ABSTRACT

A switch device is configured to communicate with a plurality of hosts and a solid state drive (SSD). The plurality of hosts includes a first host and a second host. The switch device receives a first memory access command from the SSD, the first memory access command including an indication of the first host to indicate the first memory access command is intended for the first host. The switch device uses the indication of the first host in the first memory access command to route the first memory access command to the first host. The switch device removes the indication of the first host from the first memory access command prior to sending the first memory access command to the first host via a peripheral computer interface express (PCIe) interface of the switch device.

25 Claims, 6 Drawing Sheets

Related U.S. Application Data

(60) Provisional application No. 62/716,275, filed on Aug. 8, 2018.

(56) References Cited

U.S. PATENT DOCUMENTS

| | | | |
|---|---|---|---|
| 8,185,664 | B1 | 5/2012 | Lok et al. |
| 8,897,303 | B2 | 11/2014 | Xiong |
| 8,966,164 | B1 | 2/2015 | Asnaashari et al. |
| 9,098,402 | B2 | 8/2015 | Fanning et al. |
| 9,298,648 | B2 | 3/2016 | Johnson et al. |
| 9,430,412 | B2 | 8/2016 | Huang |
| 9,652,426 | B2 | 5/2017 | Su |
| 9,842,075 | B1 | 12/2017 | Davis et al. |
| 9,934,173 | B1 | 4/2018 | Sakalley et al. |
| 10,579,305 | B2 | 3/2020 | Lu |
| 10,977,199 | B2 | 4/2021 | Suri et al. |
| 11,086,813 | B1 | 8/2021 | Schuette |
| 11,544,000 | B2 | 1/2023 | Furey et al. |
| 11,614,986 | B2 | 3/2023 | Guo |
| 2008/0104283 | A1 | 5/2008 | Shin et al. |
| 2008/0126547 | A1 | 5/2008 | Waldspurger |
| 2012/0014386 | A1 | 1/2012 | Xiong et al. |
| 2012/0110233 | A1 | 5/2012 | Higuchi et al. |
| 2013/0007332 | A1 | 1/2013 | Teh et al. |
| 2014/0122768 | A1 | 5/2014 | Su et al. |
| 2014/0189427 | A1 | 7/2014 | Jayaprakash Bharadwaj |
| 2015/0074320 | A1 | 3/2015 | Galles |
| 2015/0082080 | A1 | 3/2015 | Lin et al. |
| 2015/0169331 | A1 | 6/2015 | Nelogal et al. |
| 2015/0248366 | A1 | 9/2015 | Bergsten et al. |
| 2015/0261709 | A1 | 9/2015 | Billi |
| 2015/0293873 | A1 | 10/2015 | Shao et al. |
| 2015/0317088 | A1 | 11/2015 | Hussain et al. |
| 2016/0127492 | A1 | 5/2016 | Malwankar et al. |
| 2016/0132395 | A1 | 5/2016 | Bolen |
| 2016/0147592 | A1 | 5/2016 | Guddeti |
| 2017/0024166 | A1 | 1/2017 | Singh et al. |
| 2017/0090794 | A1 | 3/2017 | Huang |
| 2017/0212579 | A1 | 7/2017 | Tirumala et al. |
| 2017/0286363 | A1 | 10/2017 | Joshua et al. |
| 2018/0074757 | A1 | 3/2018 | Yamaguchi et al. |
| 2018/0253138 | A1 | 9/2018 | Bakshi et al. |
| 2018/0357108 | A1 | 12/2018 | Mullender et al. |
| 2019/0310913 | A1 | 10/2019 | Helmick et al. |
| 2019/0361763 | A1 | 11/2019 | Bakshi et al. |
| 2019/0361773 | A1 | 11/2019 | Berke et al. |
| 2020/0050402 | A1 | 2/2020 | Furey et al. |
| 2020/0050505 | A1 | 2/2020 | Guo et al. |
| 2020/0050558 | A1 | 2/2020 | Suri et al. |

OTHER PUBLICATIONS

Communication pursuant to Article 94(3} EPC in European Patent Application No. 19190675.9, (dated Feb. 1, 2021 (5 pages).

EP Application No. 19190605.6, Extended Search Report, dated Dec. 9, 2019, 8 pages.

EP Application No. 19190675.9, Extended Search Report, dated Dec. 9, 2019, 7 pages.

EP Application No. 19190677.5, Extended Search Report, dated Dec. 9, 2019, 7 pages.

Notice of Allowance for U.S. Appl. No. 16/532,272 dated Jun. 28, 2022. (12 pages).

NVM Express over Fabrics specification, Revision 1.0a, Jul. 17, 2018, a href="http://nvmexpress.org."target="_blank"http://nvmexpress.org./a.

Summons to attend oral proceedings pursuant to Rule 115(1) EPC for Application No. 19 190 605.6 dated Jul. 12, 2022 (7 pages).

Summons to attend oral proceedings pursuant to Rule 115(1) EPC for Application No. 19 190 675.9 dated Oct. 5, 2022 (7 pages).

U.S. Appl. No. 16/532,272, Non-Final Office Action, dated Mar. 2, 2022, 27 pages.

First Office Action for Chinese Application No. 2019107311146, mailed Oct. 26, 2023. (9 pages).

Search Report for Chinese Application No. 2019107311146, mailed Oct. 23, 2023. (3 pages).

Non-Final Office Action in U.S. Appl. No. 18/101,495, mailed Oct. 12, 2023 (6 pages).

Extended Search Report for European Patent Application No. 23216230.5, mailed Feb. 28, 2024. (8 pages).

Extended Search Report for European Patent Application No. 23207046.6, mailed Mar. 11, 2024. (8 pages).

Notice of Allowance for U.S. Appl. No. 18/101,495, mailed Feb. 2, 2024. (9 pages).

U.S. Appl. No. 16/532,186, Non-Final Office Action, mailed Dec. 31, 2019, 13 pages.

First Office Action for Chinese Application No. 201910727578.X, mailed Jun. 28, 2024. (14 pages).

Search Report for Chinese Application No. 201910727578X, mailed Jun. 28, 2024. (3 pages).

Notice of Allowance for U.S. Appl. No. 18/101,495, mailed on May 22, 2024 (10 pages).

First Office Action for Chinese Application No. 2019107309432, mailed Mar. 31, 2024. (6 pages).

Communication pursuant to Article 94(3) EPC in European Patent Application No. 19190605.6, dated Jan. 19, 2021 (5 pages).

Second Office action for Chinese Application No. 2019107311146, mailed Jul. 12, 2024. (8 pages).

Office Action for Korean Application No. 10-2019-0096062, mailed Jan. 10, 2025. (13 pages).

SWITCH DEVICE FOR INTERFACING MULTIPLE HOSTS TO A SOLID STATE DRIVE

CROSS REFERENCE TO RELATED APPLICATION

This application is a continuation of U.S. patent application Ser. No. 16/532,081 (now U.S. Pat. No. 11,544,000), filed Aug. 5, 2019, entitled, "Managed Switching Between One or More Hosts and Solid State Drives (SSDs) Based on the NVMe Protocol to Provide Host Storage Services," which claims the benefit of priority of U.S. Provisional Application Ser. No. 62/716,275 filed Aug. 8, 2018, entitled, "Method and Apparatus for Managed Switching Based on the NVMe Protocol." Both of the applications referenced above are hereby incorporated by reference in their entireties.

FIELD OF TECHNOLOGY

This disclosure relates to providing storage services to a host, namely managing switching between one or more hosts and solid state devices (SSDs) based on the non-volatile memory express (NVMe) protocol to provide the host storage services. The host storage services include virtualization services, performance and fault-tolerant services, and dual host services, among other services.

BACKGROUND

PCIe (Peripheral Component Interconnect Express), officially abbreviated as PCIe or PCI Express, is a high-speed serial computer expansion bus standard. PCIe operates as a motherboard-level interconnect between a host and peripheral components such as attached solid state drives (SSD). The host works as a server offering information resources, services, and/or applications to users or other nodes on a network. The host also manages the SSDs to obtain the needed storage services to operate using a command set for SSD access defined by Non-volatile Memory Express, also known as NVMe or NVM Express. The management of the SSD by the host adds further complexity to hardware, software, and firmware residing on the host.

SUMMARY

This disclosure relates to a NVMe switch which is arranged to provide various storage services to a host while reducing a need for the host to directly manage storage in the form of solid state devices (SSDs). The NVMe switch coordinates exchange of storage access commands and completions between the host and SSDs in a storage system to provide these services.

In an embodiment, a method is implemented by a switch device that is configured to communicate with a plurality of hosts and a solid state drive (SSD). The plurality of hosts includes a first host and a second host. The method includes: receiving, at the switch device, a first memory access command from the SSD, the first memory access command including an indication of the first host to indicate the first memory access command is intended for the first host; using, by the switch device, the indication of the first host in the first memory access command to route the first memory access command to the first host; and removing, by the switch device, the indication of the first host from the first memory access command prior to sending the first memory access command to the first host via a peripheral computer interface express (PCIe) interface of the switch device.

In another embodiment, a non-volatile memory express (NVMe) switch comprises: a PCIe interface configured to communicatively couple the NVMe switch to a plurality of hosts including a first host and a second host; a communication interface configured to communicatively couple the NVMe switch to an SSD; and circuitry that is configured to: receive a first memory access command from the SSD via the communication interface, the first memory access command including an indication of the first host to indicate the first memory access command is intended for the first host, use the indication of the first host in the first memory access command to route the first memory access command to the first host, and remove the indication of the first host from the first memory access command prior to sending the first memory access command to the first host via the PCIe interface.

In yet another embodiment, a non-transitory computer-readable medium stores machine-readable instructions that, when executed by one or more processors of a switch device that is configured to communicate with a plurality of hosts and an SSD, cause the one or more processors to at least: receive a first memory access command from the SSD, the first memory access command including an indication of the first host to indicate the first memory access command is intended for the first host; use the indication of the first host in the first memory access command to route the first memory access command to the first host; and remove, by the switch device, the indication of the first host from the first memory access command prior to sending the first memory access command to the first host via a PCIe interface of the switch device.

In this regard, the NVMe switch allows for reducing overhead on the host to obtain various storage services.

Figure 1:
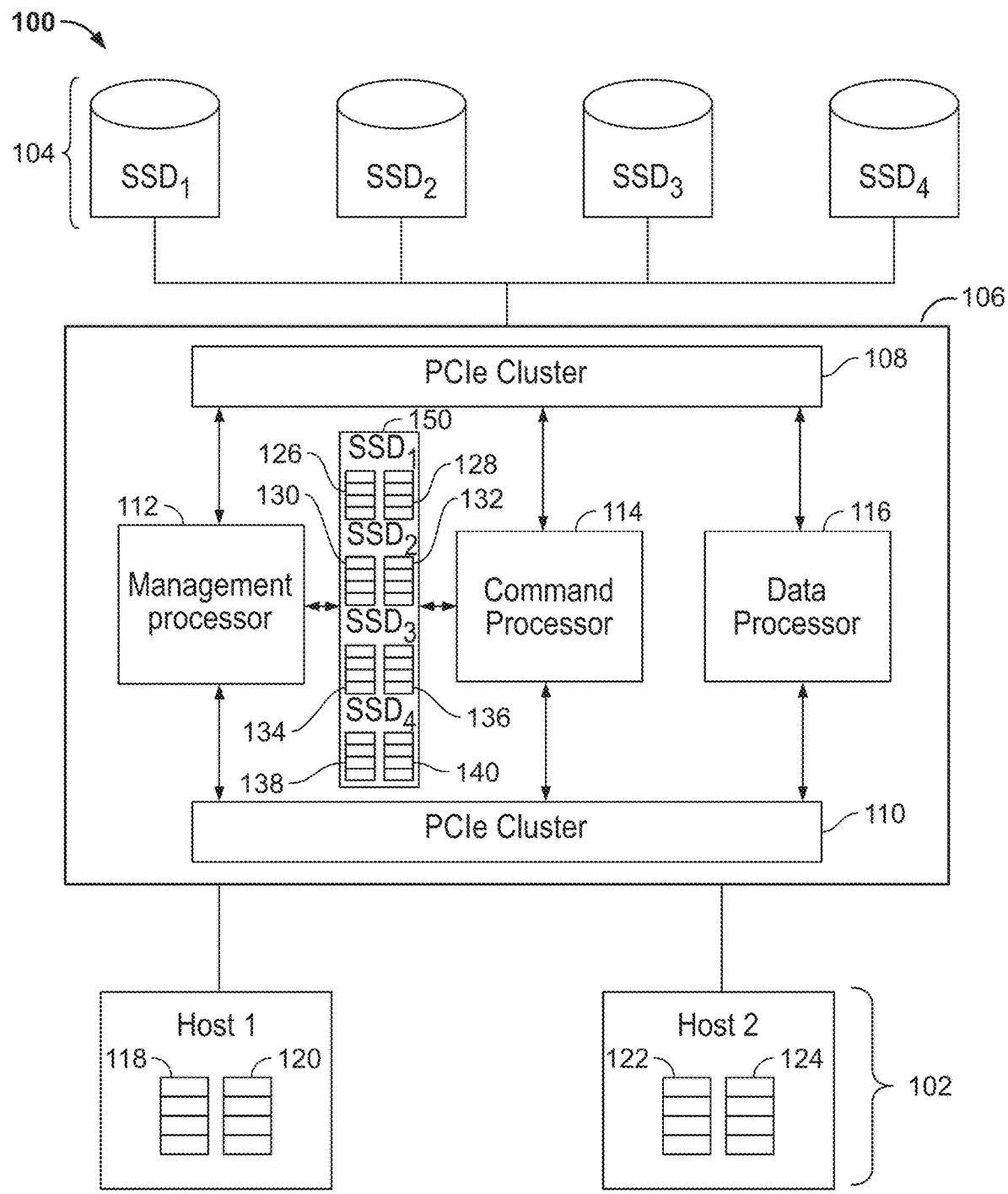
FIG. 1 illustrates an example configuration of a storage system which allows for providing various storage services to a host while reducing a need for the host to directly manage storage in the form of solid state drives (SSDs).

The drawings are for the purpose of illustrating example embodiments, but it is understood that the embodiments are not limited to the arrangements and instrumentality shown in the drawings.

DETAILED DESCRIPTION

This disclosure provides examples and details relates to providing storage services to a host by managing switching between one or more hosts and solid state devices (SSDs) based on the Non-Volatile Memory Express (NVMe) standard. The host storage services include virtualization services, a certain level of storage performance and/or storage fault tolerance, and dual host services, among other services. The principles described herein may be applied to controlling performance of other type of storage, such as a hard disk drive (HDD) or hybrid SSD/HDD drives.

FIG. 1 illustrates an example configuration of a storage system 100 which provides various storage services to a host while reducing a need for the host to directly manage storage in the form of solid state devices (SSDs). The storage system may include one or more hosts 102, a storage comprising one or more solid state drives (SSDs) 104, and a Non-Volatile Memory Express (NVMe) switch 106. The one or more hosts 102 may work as a server offering information resources, services, and/or applications to users or other nodes on a network. In some examples, the hosts may include virtual machines (VM). The VM may be implemented on the host using Peripheral Component Interconnect Express (PCIe) single root input/output virtualization (SR-IOV). The SSD 104 is an integrated circuit (IC) based storage mechanism which can store data persistently to enable the host 102 to provide needed functionality. The SSD 104 is capable of providing higher bandwidth and lower latency compared to a hard disk drive (HDD). The NVMe switch 106 may be positioned in between the host 102 and the SSD 104. The NVMe switch 106 processes NVMe commands to control PCIe based point-to-point switch connections between the one or more hosts 102 and the SSDs 104, so that every SSD 104 has its own dedicated connection to the one or more hosts 102.

The NVMe switch 106 includes a PCIe cluster 110, a management processor 112, a command processor 114, a data processor 116, and a PCIe cluster 108. In some examples, the PCIe cluster 110 may be a PCIe endpoint cluster which facilitates communication between the NVMe switch 106 and the two or more hosts 102-104, while the PCIe cluster 108 may be a PCIe root complex cluster which facilitates communication between the NVMe switch 106 and the one or more SSDs 104. The command processor 114 processes commands from the hosts 102. The command may be an NVMe command to fetch data from the SSD 104 and provide to a host or store data from a host in the SSD 104. The command processor 114 may add a tag to the command. The tag may indicate that the command is received from a specific host. The command is then sent to the SSD 104. The SSD 104 may send a PCIe memory request such as a PCIe memory read request to the NVMe switch based on the command. The PCIe memory request may include the tag to enable the data processor 116 to send the PCIe memory request to the specified host in order to perform the command associated with the host. The management processor 112 performs management functions for the NVMe switch 106. For example, if a NVMe or PCIe transaction does not conform to the what the command processor 114 can perform (e.g., either due to error, or complexity/size of the PCIe memory request), the function may be offloaded to the management processor 112. As another example, the management processor 112 may manage partitions of the SSDs 104, reservation access, and namespaces associated with the SSDs 104.

In examples, one or more hosts 102 may each implement a queue pair in accordance with NVMe to facilitate SSD access. The queue pair consists of a submission queue and a completion queue. As shown, one host may have a command queue 118 and submission queue 120 while another host may have a command queue 122 and submission queue 124. The host 102 may have additional queues such as management queues as well. A host may generate an NVMe command to fetch data stored in the SSD or store data to the SSD which is placed in the submission queue. When the command is executed by the SSD, a completion indicating execution of the NVMe command may be stored in the completion queue which is then processed by the command processor 114. Further, the NVMe switch 106 may have a device queue manager 150. The device queue manager 150 provides queue pairs to facilitate communication of NVMe commands between the NVMe switch 106 and the SSDs 104. The device queue manager 118 has corresponding submission queues and completion queues for each of the SSDs 104. As shown, a first SSD ($SSD_1$) may have a submission queue 126 and completion queue 128, a second SSD ($SSD_2$) may have a submission queue 130 and completion queue 132, a third SSD ($SSD_3$) may have a submission queue 134 and completion queue 136, and a fourth SSD ($SSD_4$) may have a submission queue 138 and completion queue 140. In this regard, the command processor 114 may terminate NVMe commands from the host 102 associated with access to the SSDs 104 and may distribute additional commands to the SSDs 104 via the queues in the device queue manager 150 to facilitate providing various storage services to the host such as virtualization services, a certain level of storage performance and/or storage fault tolerance, and access to the two or more hosts as described in further detail below. The host 102 is isolated from having to manage the storage system 100 to obtain these services.

Example Virtualization Services

In some examples, the NVMe switch may facilitate virtualizing the SSDs as a virtual disk (VD). A VD is a software component that emulates an actual physical drive such as the SSDs, but looks like and behaves like an actual physical device. The NVMe switch may also support creation of virtual namespaces associated with physical hosts and private virtual namespaces for VMs.

Figure 2:
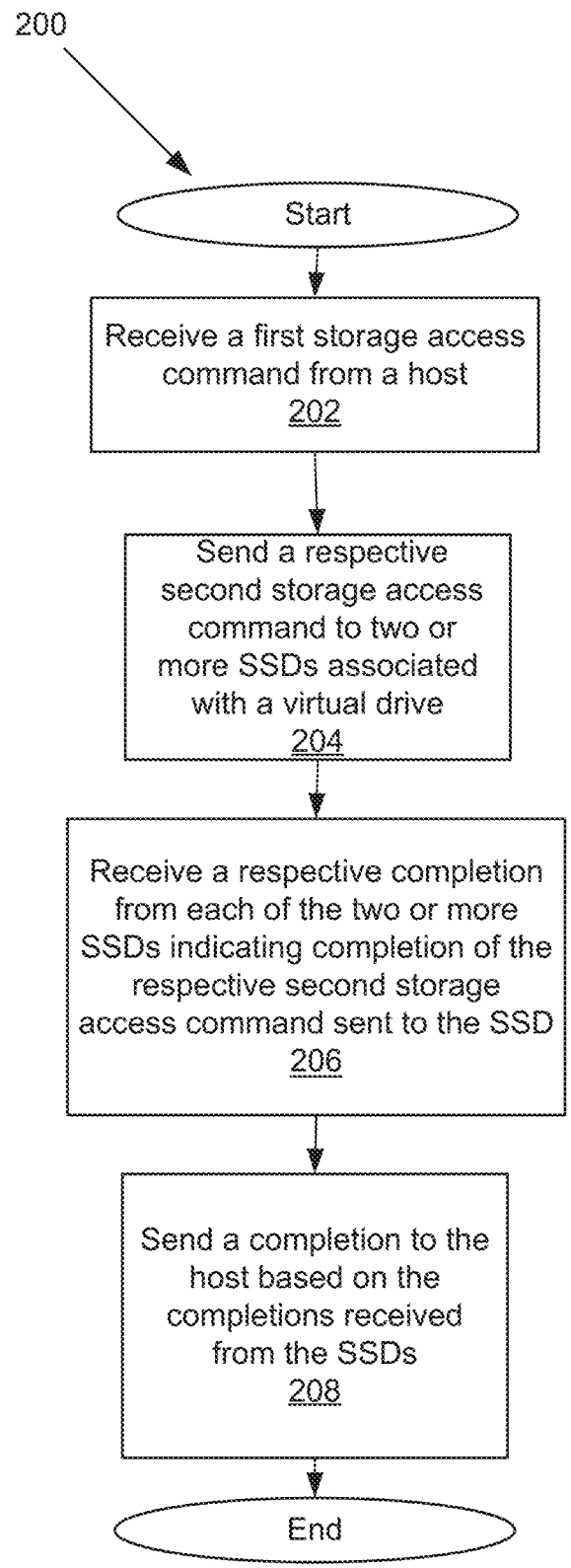
FIG. 2 is an example flowchart of functions which enables a Non-Volatile Memory Express (NVMe) switch to abstract the storage as VDs.

FIG. 2 is an example flow chart 200 of functions which enables the NVMe switch to abstract storage such as the SSDs as a VD. The NMVe switch may provide virtualization services to the host while reducing a need for the host to manage the storage to obtain these services. The NVMe switch may present a drive to the host. The host may access the device as a physical drive, but the NVMe switch may service the access as a VD based on two or more of the SSDs by providing aggregation services. The NVMe switch may implement this abstraction in software, hardware, or a combination or hardware and software. In examples, the functions may be performed by the command processor of the NVMe switch.

At 202, a first storage access command such as an NVMe store command or NVMe fetch command may be received from the host. The first storage access command may be to access a drive. The NVMe switch may virtualize the plurality of SSDs as a VD by terminating the storage access command from the host and not sending it to the SSD.

Instead, at 204, the NVMe switch may send a respective second storage access command to two or more SSDs associated with the VD. For example, if the VD is associated with four physical SSDs and the storage access command from the host requires access to these four physical SSDs, the command processor may send a second storage access command to each of the four SSDs associated with the VD. A storage access command is inserted into the submission queues associated with these four SSD to send the second storage access commands to each of the SSDs.

At 206, the NVMe switch may receive a respective completion from each of the two or more SSDs indicating completion of the respective second storage access command sent to the SSD. For example, the NVMe switch may receive a completion from each of the four SSDs. In examples, a completion is inserted into a respective completion queue of the device queue manager which is associated with the SSD which generated the completion.

The host may expect to receive a single completion from the storage system for its storage access command. From the perspective of the host, the access to the VD is the same as access to a single physical drive, even though the VD may be associated with a plurality of SSDs.

At 208, the NVMe switch via the command processor may send a completion to the host based on the completions received from the SSDs which in some examples is a single completion sent to the host. By sending a single completion to indicate completion of the first storage access command, the drive is virtualized as a single drive to the host which expects to receive a single completion.

The management processor may also allow for associating a capacity to the VD or maximum available storage. The NVMe switch may perform storage operations requested by the host, but if the storage operation exceeds the capacity of the VD, the management processor may indicate an error to the host. The management processor may also facilitate generating namespaces. Namespace management is a process of defining logical blocks of storage which are assigned a namespace. A single namespace may be typically associated with a single SSD or VD. The management processor may allow for partitioning the single namespace into a plurality of virtual namespaces associated with the single SSD or VD. For example, the management processor may have an offset table which associates virtual namespaces with different memory offsets in the single namespace. To illustrate, a namespace0 may be subdivided into virtual namespaces 1 to 10, where each virtual namespace is associated with respective memory offset in namespace0. In this regard, each virtual namespace is associated with a unique plurality of logical blocks in the namespace. The NVMe switch may advertise these virtual namespaces to the host with namespace IDs (NSIDs) and the host may reserve a virtual namespace using NVMe namespace commands. Then, the host may use the NSID to obtain access to the namespace.

In some examples, the management processor may limit access of virtual namespaces. This virtual namespace may be private or accessible by only one host if the host includes a VM. This virtual namespace is referred to as a private virtual namespace. Access to the private virtual namespaces is limited to the one VM because the namespace may be located on an SSD which is also accessed by other VMs or other hosts. Access is limited to prevent the private virtual namespace of one VM being written or read intentionally or unintentionally by another VM. The management processor may offer the private virtual namespace to the VM through a PCIe virtual function (VF). The PCIe VF may define the logical blocks associated with the private virtual namespace to the VM which are then accessed via storage access commands. Further, in some examples, a quality of service and bandwidth metering associated with access to the virtual private namespace may be controlled by the NVMe switch by a throttling process because the SSD associated with the virtual private namespace may be accessed by other VMs or hosts. The control of the quality of service and bandwidth metering for the VM allows for guaranteeing a minimum quality of service and bandwidth for the other VMs, and reducing overhead on the actual physical host running the VM.

Example Performance and/or Fault Tolerant Services

In some examples, the NVMe switch may facilitate controlling storage performance, such as bandwidth of read/write access to the storage. The NVMe switch may also facilitate providing fault tolerant services to the host.

Figure 3:
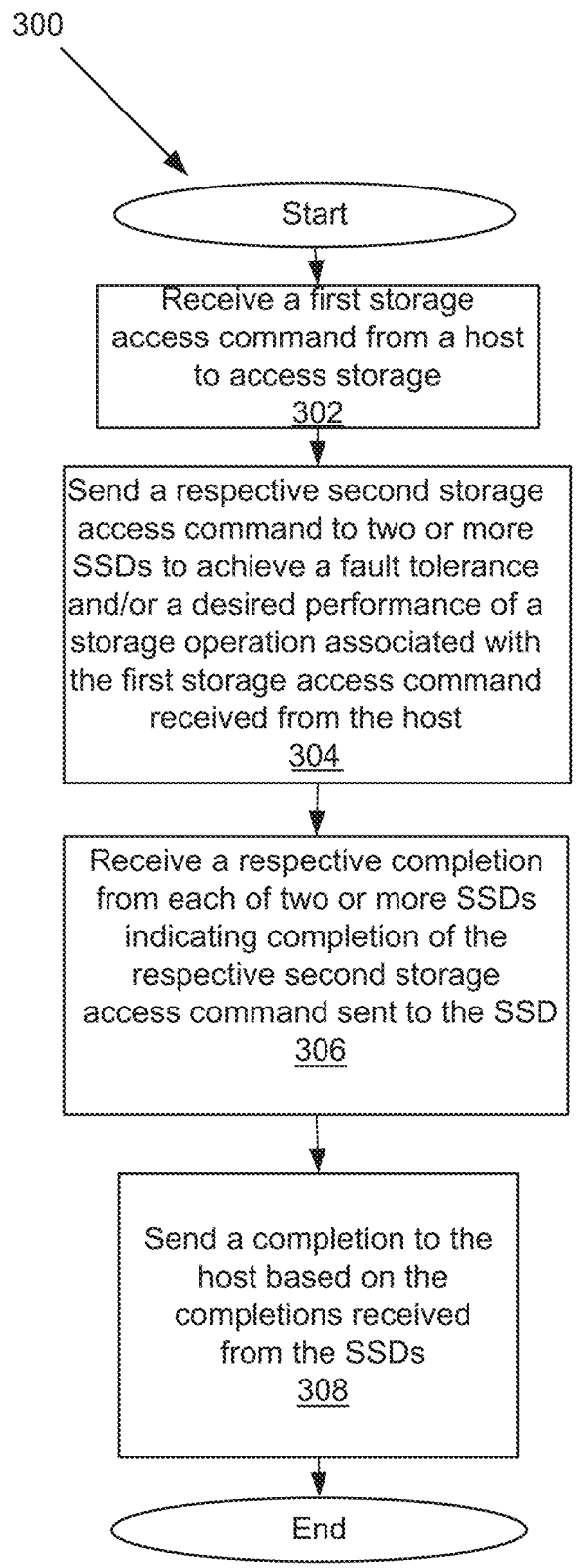
FIG. 3 is an example flowchart of functions which enables the NVMe switch to abstract the storage to provide a certain level of storage performance and/or storage fault tolerance to the host.

FIG. 3 is an example flowchart 300 of functions which enables the NVMe switch to abstract the storage to provide a certain level of storage performance and/or fault tolerance storage to the host while reducing a need for the host having to manage the storage device obtain these services. The storage performance and/or fault tolerance may take many forms, including operation of the SSDs as just a bunch of flash (JBOF) or a redundant array of independent disks (RAID). The NVMe switch may implement this abstraction in software, hardware, or a combination or hardware and software. In examples, the functions may be performed by the command processor of the NVMe switch.

At 302, a first storage access command such as an NVMe store or fetch command may be received from the host to access storage. The host may expect the storage to provide a certain performance such as RAID 0 or a balance of read performance and/or fault tolerance associated with RAID 1 to RAID 10. The NVMe switch may provide these services without the host having to manage the SSDs to obtain the read performance and/or fault tolerance by terminating the storage access command from the host and not sending it to the SSDs.

Instead, at 304, the NVMe switch may send a respective second storage access command to two or more of the SSDs to achieve a certain level of performance and/or fault tolerance of a storage operation associated with the first storage access command received from the host. In RAID 0 or JBOF, data may be written or read in parallel from multiple SSDs increasing bandwidth of the storage operation. The NVMe switch inserts a second storage access command into a respective submission queue of the two or more SSD to send the second storage access command to each of the SSDs to read data in parallel from the two or more SSDs and/or write the data in parallel to the two or more SSDs. In RAID 1 to RAID 10, data associated with the storage operation may be duplicated by mirroring or striping data on multiple SSDs to improve fault tolerance. In examples, the NVMe switch inserts a second storage access command into a respective submission queue of the two or more SSD to send the second storage access command to each of the SSDs to read data written in parallel from the two or more SSDs and/or write the data in parallel to the two or more SSDs associated with the mirroring or striping. The second storage access commands may be used to read data when one SSD is failing by reading data in another drive and read or write data in rebuilding a new drive when the failed drive is replaced.

At 306, the NVMe switch may receive a respective completion from each of the two or more SSDs indicating completion of the respective second storage access command sent to the SSD. For example, the NVMe switch may receive a completion from each of the four SSDs. In examples, a completion is inserted into a respective completion queue in the device queue manager which is associated with the SSD which generated the completion.

From the perspective of the host, the access to the storage device with the expected performance and/or fault tolerance is abstracted to the host. In this regard, the host may expect to receive a single completion from the storage system for its storage access request even though the expected storage performance and/or fault tolerance involves access to multiple SSDs.

At 308, the NVMe may send a completion to the host based on the completions received from the SSDs. The completion sent to the host may be a single completion indicating completion of the commands sent to the SSDs. By sending the single completion to indicate completion of the first storage access command, the drive accessed by the host has the expected performance and/or fault tolerance, but without the host having to manage the SSDs to obtain these services.

Example Dual Host Services

A PCIe connection may comprise 2, 4, 8, or 16 data transmission lanes. Each transmission lane may comprise two pairs of wires, one pair for transmitting and one pair for receiving. In some examples, two or more hosts may be coupled to the PCIe connection and then connected to the NVMe switch. For example, the PCIe connection may be segregated into four lanes and two lanes may be assigned to each host. Further, the SSDs coupled to the PCIe switch may have single port that is shared between the two or more hosts. In this regard, the NVMe switch may be responsible for routing data from the single port to the appropriate host to perform storage access commands when the storage system has two or more hosts. In other examples, the two or more hosts may include VMs. The NVMe switch may also be responsible for routing data to the VM from the single port to perform the storage access commands.

Figure 4:
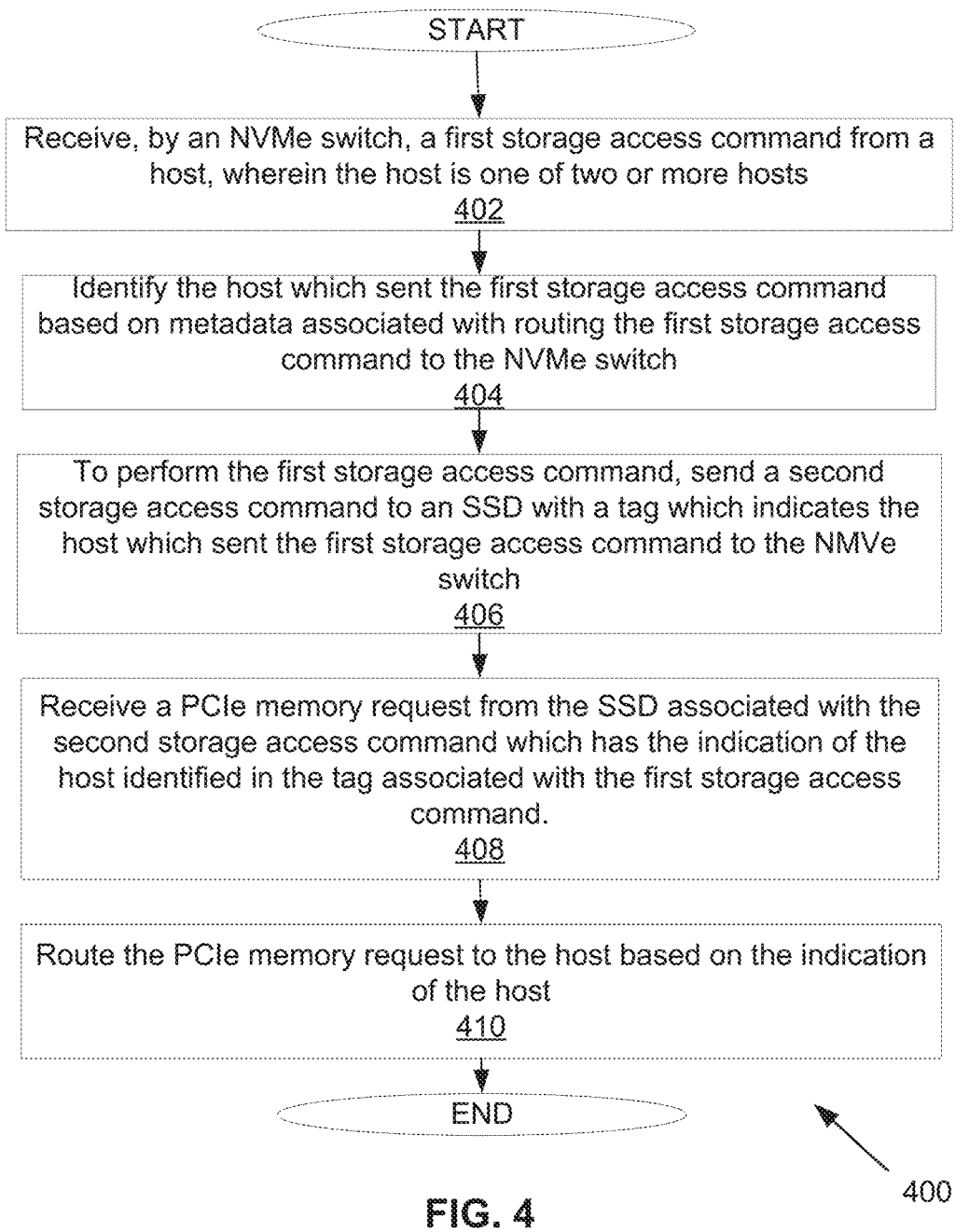
FIG. 4 is an example flow chart of functions for processing a storage access command when the storage system has two or more hosts.

FIG. 4 is an example flowchart 400 of functions for processing a storage access command when the storage system has two or more hosts. In some examples, the NVMe switch may be also coupled to single port SSDs rather than dual port SSDs. Unlike the dual port SSDs which permits access by two hosts, the single port SSD may permit access by only one host. The functions facilitate associating the storage access command with the host which sent the storage access command. The NVMe switch may implement this processing in software, hardware, or a combination of hardware and software. In examples, the functions may be performed by one or more of the data processor and command processor of the NVMe switch. Further the functions in the flowchart 400 may be used to enable the virtualization services, control of read/write performance, and fault tolerant services described above when the storage system has two or more hosts.

At 402, a first storage access command is received from a host. The host may be one of two or more hosts coupled to an NVMe switch which receives the first storage access command. The first storage access command may be received from a PCIe address associated with a host, where each host has its own PCIe address. The two or more hosts may be actual physical hosts connected to a PCI port. At 404, the NVMe switch may identify the host which sent the first storage access command based on metadata associated with routing the storage access command to the NVMe switch. The NVMe switch may terminate the first storage access command from the host. Instead, to perform the first storage access command, at 406, the NVMe switch may send a second storage access command to an SSD with a tag which indicates the host which sent the first storage access command to the NVMe switch. The tag may be inserted in upper bytes of a NVMe Physical Region Page address in some examples. At 408, the NVMe switch may receive a PCIe memory request from the SSD based on the second storage access command which has the indication of the host identified in the tag associated with the first storage access command. For example, the PCIe memory request may be a data fetch from a data buffer in the host associated with a read or write command originally received from the host and the tag may be inserted in upper bytes of a NVMe Physical Region Page address in the PCIe memory request. By including the tag, the SSD is able to tell the command processor that the PCIe memory request is to be routed to the host identified by the tag. The SSD may be able to process storage access commands in an order different from an order by which they are sent to the SSD, and the NVMe switch will still be able to identify the host where the PCIe memory request associated with a storage access command is to be sent. At 410, the NVMe switch may route the PCIe memory request to the host based on the indication of the host. The data processor may perform this routing, and in some examples, the data processor may remove the tag from the PCIe memory request and then route the PCIe memory request to the host.

In examples, the NVMe switch may support NVMe reservations. The management processor may define a reservation table to coordinate access by the two hosts to a shared namespace. The reservation table may indicate whether a host has proper permission to perform a requested operation in the shared namespace. If the host does not have the proper permission, the requested operation is denied.

Figure 5:
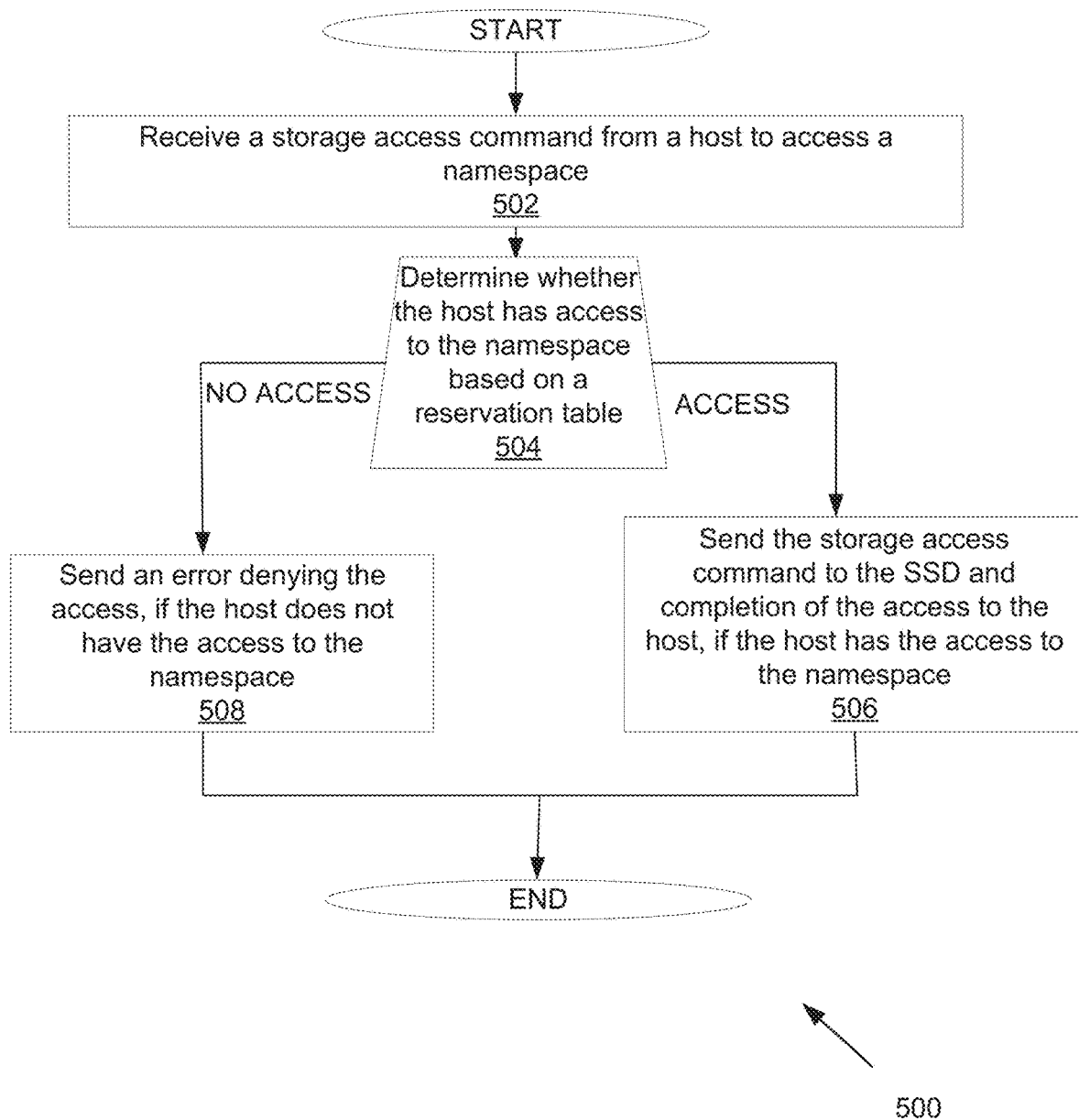
FIG. 5 is an example flow chart of functions associated with performing NVMe reservation access at the NVMe switch.

FIG. 5 is an example flow chart 500 of functions associated with the NVMe switch performing NVMe reservation access. The NVMe switch may implement this abstraction in software, hardware, or a combination or hardware and software. In examples, the functions may be performed by one or more of the command processor, management processor, and data processor of the NVMe switch.

At 502, the NVMe switch may receive a storage access command from a host to access a namespace. The host may want to read data or write data to the namespace. In some examples, the namespace may be sharable between two or more hosts. Further, each host may have certain access permissions to the shared namespace. For example, one host may be able to read and write to the namespace while the other host may be able to only read data in the namespace. The permissions may be defined by a reservation table which indicates the permissions associated with each host. The NVMe switch may terminate the storage access command from the host. At 504, the NVMe switch may determine whether the host has access to the namespace based on the reservation table. Depending on a type of access to the namespace by the host, e.g., write access, read access, and the reservation held by the host indicated by the reservation table, e.g., write permission, read permission, the management processor may determine whether the storage access command is to be completed or denied. For example, if the host is requesting write access and it has write permission, then the access is granted. As another example, if the host is requesting write access and it has read permission, then the access is denied. At 506, the NVMe switch sends the storage access command to the SSD and completion of the access to the host, if the host has the access to the namespace. In some examples, the completion of access may be sent to the host when the SSD sends a completion to the NVMe switch indicating completion of the storage access command such as the read or write. At 508, the NVMe switch sends an error denying the access if host does not have the access to the namespace.

Example Apparatus

Figure 6:
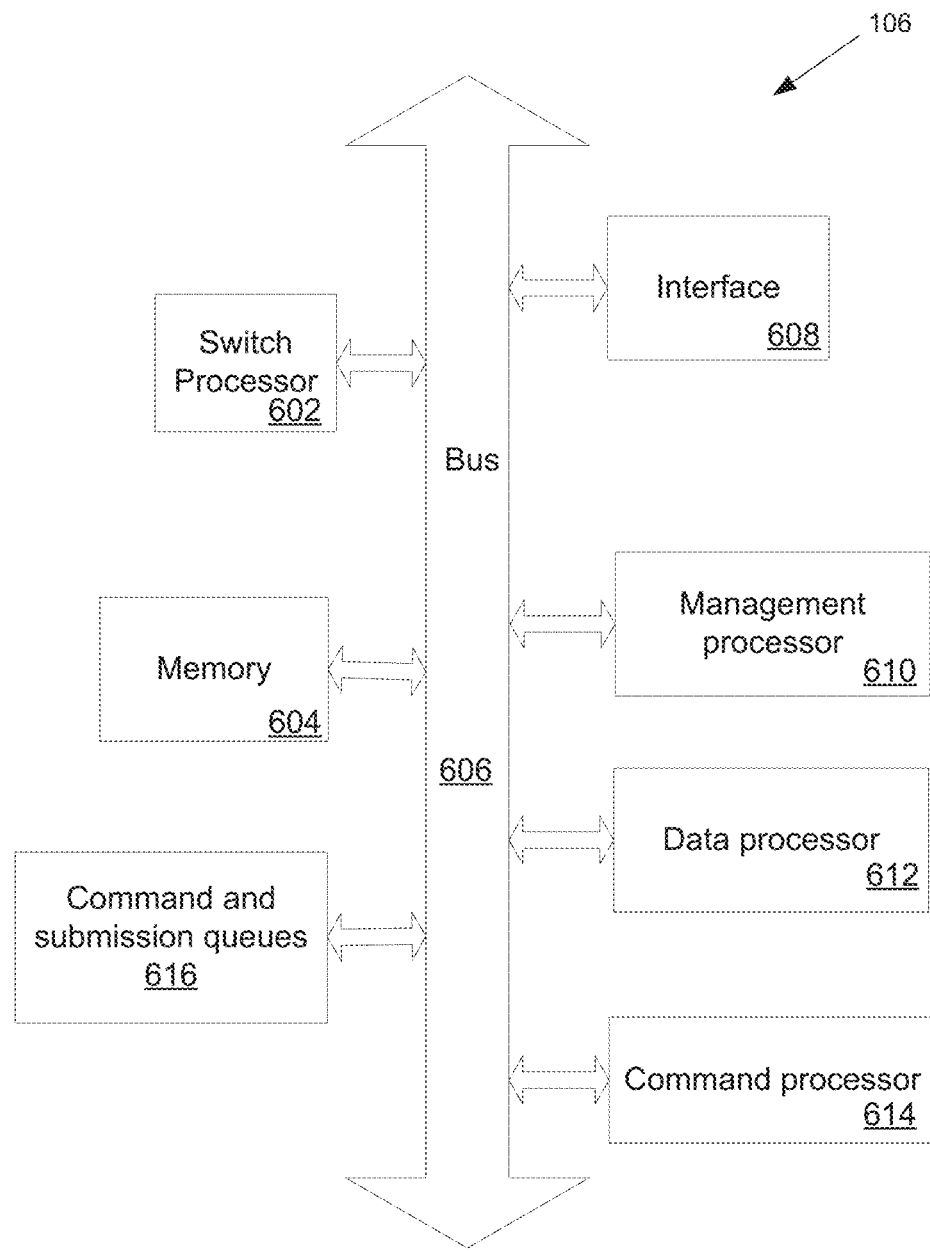
FIG. 6 is an example block diagram of the NVMe switch.

FIG. 6 is a simplified example block diagram of the NVMe switch 106 for providing various storage services to a host while reducing a need for the host to manage solid state devices (SSDs). The NVMe switch 106 includes a switch processor 602 (possibly including multiple processors, multiple cores, multiple nodes, and/or implementing multi-threading, etc.) that coordinates operations on the NVMe switch 106. The NVMe switch 106 includes memory 604. The memory 604 may be system memory (e.g., one or more of cache, random access memory (RAM), synchronous RAM (SRAM), dynamic RAM (DRAM), zero capacitor RAM, Twin Transistor RAM, embedded DRAM (eDRAM), extended data output RAM (EDO RAM), double data rate RAM (DDR RAM), electrically erasable programmable read only memory (EEPROM), Nano-RAM (NRAM), resistive RAM (RRAM), silicon-oxide-nitride-oxide-silicon memory (SONOS), parameter random access memory (PRAM), etc.) or any one or more other possible realizations of non-transitory machine-readable media/medium.

The NVMe switch 106 also includes a bus 606 (e.g., Peripheral Component Interconnect (PCI), Industry Standard Architecture (ISA), PCI-Express, New Bus (NuBus), Advanced Extensible Bus AXI Bus etc.). Coupled to the bus 606 is interface 608 which facilitates communication with the non-volatile memory array of the SSD and the host. In this regard, the interface 608 may include the PCIe EP cluster and the PCIe RC cluster which provide communication to the hosts and SSDs, respectively.

The management processor 610, data processor 612, and command processor 614 may implement any one of the previously described functionalities such as VD, RAID, and dual host functions while reducing a need for the host to manage SSDs. These functions may be implemented in hardware and/or software (e.g., computer code, program instructions, program code, computer instructions) stored on a non-transitory machine readable medium/media. In some instances, the processor 602 and memory 604 may implement or facilitate implementing the functionalities instead of or in addition to management processor 610, data processor 612, and command processor 614. The NVMe switch 106 may further include one or more command and submission queues 616 to facilitate sending NVMe commands to the SSDs. Further, realizations can include fewer or additional components not illustrated in FIG. 6 (e.g., video cards, audio cards, additional network interfaces, peripheral devices, etc.). The processor 602 and the memory 604 are coupled to the bus 606. Although illustrated as being coupled to the bus 606, the memory 604 can be coupled to the processor 602.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method implemented by a switch device that is configured to communicate with a plurality of hosts and a solid state drive (SSD), the plurality of hosts including a first host and a second host, the method comprising:
receiving, at the switch device, a first memory access command from the SSD, the first memory access command including an indication of the first host to indicate the first memory access command is intended for the first host;
using, by the switch device, the indication of the first host in the first memory access command to route the first memory access command to the first host; and
removing, by the switch device, the indication of the first host from the first memory access command prior to sending the first memory access command to the first host via a peripheral computer interface express (PCIe) interface of the switch device.

2. The method of claim 1, wherein the indication of the first host is included in a tag in the first memory access command.

3. The method of claim 2, wherein the tag is included in a non-volatile memory express (NVMe) physical region page address field of the first storage access command.

4. The method of claim 1, further comprising, prior to receiving the first memory access command from the SSD:
receiving, from the first host via the PCIe interface of the switch device, a second storage access command to access the SSD, wherein the second storage access command conforms to a non-volatile memory express (NVMe) protocol;
generating, at the switch device, a third storage access command based on the second storage access command, including generating the third storage access command to include an indication of the first host; and
sending, by the switch device, the third storage access command to the SSD;
wherein the first storage access command from the SSD is responsive to the third storage access command.

5. The method of claim 4, wherein generating the third storage access command comprises:
adding, by the switch, a tag to the second storage access command, the tag having the indication of the first host.

6. The method of claim 5, wherein adding the tag to the second storage access command comprises:
inserting, by the switch, the tag in a non-volatile memory express (NVMe) physical region page address field of the second storage access command.

7. The method of claim 4, further comprising:
terminating, by the switch device, the second storage access command at the switch device.

8. The method of claim 1, further comprising:
processing, at the switch device, non-volatile memory express (NVMe) commands to control PCIe-based point-to-point switch connections between the plurality of hosts and the SSD.

9. A non-volatile memory express (NVMe) switch, comprising:
a peripheral computer interface express (PCIe) interface configured to communicatively couple the NVMe switch to a plurality of hosts including a first host and a second host;
a communication interface configured to communicatively couple the NVMe switch to a solid state drive (SSD); and
circuitry configured to:
receive a first memory access command from the SSD via the communication interface, the first memory access command including an indication of the first host to indicate the first memory access command is intended for the first host,
use the indication of the first host in the first memory access command to route the first memory access command to the first host, and
remove the indication of the first host from the first memory access command prior to sending the first memory access command to the first host via the PCIe interface.

10. The NVMe switch of claim 9, wherein the indication of the first host is included in a tag in the first memory access command.

11. The NVMe switch of claim 10, wherein the tag is included in an NVMe physical region page address field of the first storage access command.

12. The NVMe switch of claim 9, wherein the circuitry is further configured to, prior to receiving the first memory access command from the SSD:
receive, via the PCIe interface, a second storage access command from the first host to access the SSD, wherein the second storage access command conforms an NVMe protocol;
generate a third storage access command based on the second storage access command, including generating the third storage access command to include an indication of the first host; and
send the third storage access command to the SSD via the communication interface;
wherein the first storage access command from the SSD is responsive to the third storage access command.

13. The NVMe switch of claim 12, wherein the circuitry is configured to generate the third storage access command at least by adding a tag to the second storage access command, the tag having the indication of the first host.

14. The NVMe switch of claim 13, wherein the circuitry is configured to insert the tag in an NVMe physical region page address field of the second storage access command.

15. The NVMe switch of claim 12, wherein the circuitry is further configured to:
terminate the second storage access command at the switch device.

16. The NVMe switch of claim 9, wherein the circuitry is further configured to:
process NVMe commands to control PCIe-based point-to-point switch connections between the plurality of hosts and the SSD.

17. The NVMe switch of claim 9, wherein:
the PCIe interface is a first PCIe interface; and
the communication interface is a second PCIe interface configured to communicatively couple the NVMe switch to the SSD.

18. A non-transitory computer-readable medium storing machine-readable instructions that, when executed by one or more processors of a switch device that is configured to communicate with a plurality of hosts and a solid state drive (SSD), cause the one or more processors to at least:
receive a first memory access command from the SSD, the first memory access command including an indication of the first host to indicate the first memory access command is intended for the first host;
use the indication of the first host in the first memory access command to route the first memory access command to the first host; and
remove the indication of the first host from the first memory access command prior to sending the first memory access command to the first host via a peripheral computer interface express (PCIe) interface of the switch device.

19. The non-transitory computer-readable medium of claim 18, wherein the indication of the first host is included in a tag in the first memory access command.

20. The non-transitory computer-readable medium of claim 19, wherein the tag is included in a non-volatile memory express (NVMe) physical region page address field of the first storage access command.

21. The non-transitory computer-readable medium of claim 18, further storing machine-readable instructions that, when executed by the one or more processors, cause the one or more processors to, prior to receiving the first memory access command from the SSD:
receive, from the first host via the PCIe interface of the switch device, a second storage access command to access the SSD, wherein the second storage access command conforms to a non-volatile memory express (NVMe) protocol;
generate a third storage access command based on the second storage access command, including generating the third storage access command to include an indication of the first host; and send the third storage access command to the SSD;
wherein the first storage access command from the SSD is responsive to the third storage access command.

22. The non-transitory computer-readable medium of claim 21, wherein the machine-readable instructions are configured to, when executed by the one or more processors, cause the one or more processors to:
generate the third storage access command at least by adding a tag to the second storage access command, the tag having the indication of the first host.

23. The non-transitory computer-readable medium of claim 22, wherein the machine-readable instructions are configured to, when executed by the one or more processors, cause the one or more processors to:
insert the tag in a non-volatile memory express (NVMe) physical region page address field of the second storage access command.

24. The non-transitory computer-readable medium of claim 21, further storing machine-readable instructions that, when executed by the one or more processors, cause the one or more processors to:
terminate the second storage access command at the switch device.

25. The non-transitory computer-readable medium of claim 18, further storing machine-readable instructions that, when executed by the one or more processors, cause the one or more processors to:
process non-volatile memory express (NVMe) commands to control PCIe-based point-to-point switch connections between the plurality of hosts and the SSD.

* * * * *